(12) United States Patent
Jiang et al.

(10) Patent No.: US 11,507,727 B2
(45) Date of Patent: Nov. 22, 2022

(54) FONT RENDERING METHOD AND APPARATUS, AND COMPUTER-READABLE STORAGE MEDIUM

(71) Applicant: BEIJING FOUNDER HANDWRITING DIGITAL TECHNOLOGY CO., LTD, Beijing (CN)

(72) Inventors: Jianbin Jiang, Beijing (CN); Huijun Wan, Beijing (CN); Guangcan Dong, Beijing (CN); Yang Yu, Beijing (CN)

(73) Assignee: BEIJING FOUNDER HANDWRITING DIGITAL TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 17/238,630

(22) Filed: Apr. 23, 2021

(65) Prior Publication Data

US 2021/0240913 A1    Aug. 5, 2021

Related U.S. Application Data

(63) Continuation of application No. PCT/CN2018/121554, filed on Dec. 17, 2018.

(30) Foreign Application Priority Data

Nov. 23, 2018    (CN) .......................... 201811405468.3

(51) Int. Cl.
*G06F 40/109*    (2020.01)
*G06F 40/151*    (2020.01)
(Continued)

(52) U.S. Cl.
CPC .......... *G06F 40/109* (2020.01); *G06F 40/151* (2020.01); *G06T 3/4007* (2013.01); *G06T 13/80* (2013.01)

(58) Field of Classification Search
CPC ... G06F 40/109; G06F 40/151; G06T 3/4007; G06T 13/80
See application file for complete search history.

(56) References Cited

U.S. PATENT DOCUMENTS

| | | | |
|---|---|---|---|
| 6,504,545 B1* | 1/2003 | Browne | G06T 13/00 345/473 |
| 10,242,480 B2* | 3/2019 | Shanbhag | G06T 11/203 |

(Continued)

FOREIGN PATENT DOCUMENTS

| | | |
|---|---|---|
| CN | 104461483 A | 3/2015 |
| CN | 105096361 A | 11/2015 |

(Continued)

OTHER PUBLICATIONS

International Search Report dated Aug. 22, 2019 in corresponding International Application No. PCT/CN2018/121554; 6 pages.

(Continued)

*Primary Examiner* — Stephen S Hong
*Assistant Examiner* — Nicholas Hasty
(74) *Attorney, Agent, or Firm* — Maier & Maier, PLLC

(57) ABSTRACT

A font rendering method, apparatus and a computer-readable storage medium. The font rendering method includes: receiving a character string that needs to be rendered and reading a font file; parsing the font file to obtain text character pattern information and template information corresponding to the character string; generating an animation unit according to the text character pattern information and the template information; rendering the animation unit. Through the above font rendering method, corresponding template effects can be customized according to different font effects and different rows and columns, and mixed arrangement of text size, customized text position, customized text color and special effects are supported, which are more suitable for scene matching and picture-text combin- (Continued)

ing, fully expressing semantic priority, enhancing text visual impact, highlighting the focus of the language and the text artistic conception.

15 Claims, 4 Drawing Sheets

(51) Int. Cl.
*G06T 3/40* (2006.01)
*G06T 13/80* (2011.01)

(56) References Cited

U.S. PATENT DOCUMENTS

| | | | |
|---|---|---|---|
| 2006/0170684 A1* | 8/2006 | Kobayashi | G06T 15/04 345/467 |
| 2010/0107079 A1* | 4/2010 | Langmacher | G06T 11/203 715/720 |
| 2013/0021361 A1 | 1/2013 | Liao | |
| 2021/0124796 A1* | 4/2021 | Singh | G06T 11/001 |

FOREIGN PATENT DOCUMENTS

| | | |
|---|---|---|
| CN | 106294291 A | 1/2017 |
| CN | 106649209 A | 5/2017 |
| CN | 107665186 A | 2/2018 |
| CN | 107909628 A | 4/2018 |
| JP | 2008-250342 A | 10/2008 |
| WO | 2008015825 A1 | 2/2008 |

OTHER PUBLICATIONS

Office Action dated Nov. 4, 2020 in corresponding Chinese Application No. 201811405468.3; 6 pages.

Japanese Office Action dated Jun. 4, 2022, in corresponding to Japanese Application No. 2021-529688; 6 pages (with English Translation).

Masafumi Shimada et al.; "Kanji Database and its Application-Teaching Material Examples by Using SVG"; IEICE Technical Report vol. 103 No. 368, Japan, Institute of Electronics, Information and Communication Engineers, Oct. 10, 2003; pp. 53-58; 7 pages (English-language abstract included).

* cited by examiner

FONT RENDERING METHOD AND APPARATUS, AND COMPUTER-READABLE STORAGE MEDIUM

CROSS-REFERENCE TO RELATED APPLICATIONS

This application is a continuation of International Application No. PCT/CN2018/121554, filed on Dec. 17, 2018, which claims priority to Chinese Patent Application No. 201811405468.3, filed on Nov. 23, 2018. The disclosures of the aforementioned applications are hereby incorporated by reference in their entireties.

TECHNICAL FIELD

The present disclosure relates to the technical field of text processing, and in particular, to a font rendering method, a font rendering apparatus, and a computer-readable storage medium.

BACKGROUND

The traditional way of text typesetting is from left to right, from top to bottom, with fixed row spacing and column spacing, which is not creative enough and the page effect is too monotonous; the emotion displaying font can only be fixed word, and they need to be made in advance, so the effect cannot be presented immediately according to the user input; Chinese word cannot be extracted when picture emotion are copied; in addition, the drawing methods in the market are all done through the method of the upper layer or central processing unit (CPU), which is not suitable for using on low-performance terminal device since the large amount of computation, and cannot be done with a cool effect.

SUMMARY

The present disclosure aims at solving at least one of the technical problems existing in the prior art or related technologies.

Therefore, one aspect of the present disclosure is to provide a font rendering method.

Another aspect of the present disclosure is to provide a font rendering apparatus.

Yet another aspect of the present disclosure is to provide a computer-readable storage medium.

In view of this, the present disclosure provides a font rendering method, including: receiving a character string that needs to be rendered and reading a font file; parsing the font file to obtain text character pattern information and template information corresponding to the character string; generating an animation unit according to the text character pattern information and the template information; rendering the animation unit.

According to the font rendering method of the present disclosure, a character string that needs to be rendered is received, for example, a character string input by a user is received from a client; a font file such as a dynamic happy-box TrueTypeFont (TTF) font library file is read; the font file is parsed to obtain text character pattern information and template information corresponding to the character string, and the text character pattern information and the template information are combined to generate an animation unit, where the frequency of the animation can be a fixed frame interval or an irregular frame interval; and then the animation unit is rendered; and after the rendering, it is outputted for performing effects presentation. Through the font rendering method of the present disclosure, corresponding template effects can be customized according to different font effects and different rows and columns, and mixed arrangement of text size, customized text position, customized text color and special effects are supported, which are more suitable for scene matching and picture-text combining, fully expressing semantic priority, enhancing text visual impact, highlighting the focus of the language and the text artistic conception, and presenting personalized effects of any different styles immediately according to user input, thus greatly meeting the personalized requirements of users during information interaction.

In the above technical solution, preferably, before the step of generating the animation unit according to the text character pattern information and the template information, it further includes: performing interpolation operation on each motion attribute in the text character pattern information and/or the template information; the interpolation operation includes any one or combination of the following: a scaling, a rotation, a displacement, a color, a transparency, a stroke, a shadow and a luminescence.

In this technical solution, before the step of performing data combination between the text character pattern information and the template information, the interpolation operation is performed on each motion attribute in the text character pattern information and/or template information, so that the motion effect of fonts can be smoother and smoother, and the transformation between character pattern and templates can be realized, such as the scaling, the rotation, the displacement, the color, the transparency, the stroke, the shadow, the luminescence, etc., thereby ensuring the diversification, personalization and coolness of fonts and enhancing the visual effect.

In any of the above technical solutions, preferably, the step of rendering the animation unit specifically includes: performing frame layer rendering and color filling on each frame of data of the animation unit by GPU; where the frame layer rendering includes background effect drawing, single word image effect drawing, whole image effect drawing, font effect drawing and foreground effect drawing; a way of the color filling includes any one or combination of the following: a gradient, a texture, a pure color and an animation.

In this technical solution, the present disclosure renders the animation unit based on the Open Graphics Library (OpenGL) technology and using the Graphics Processing Unit (GPU). OpenGL is a hardware-independent software interface, which can be transplanted between various platforms. Therefore, no matter for system-level access or application-level access, both of them can be well compatible. Specifically, the animation unit is sent to GPU in the data format of each frame for performing frame layer rendering and the color filling is performed simultaneously. After the rendering is completed, frame layer data is extracted from GPU, frame bitmap data is formed in memory, and the frame bitmap data is output to external application for performing effect presentation. The frame layer rendering process includes background effect drawing, single word image effect drawing, whole image effect drawing, font effect drawing and foreground effect drawing; the way of the color filling includes, but is not limited to, any one or combination of the gradient, the texture, the pure color and the animation. The present disclosure performs font rendering and animation rendering based on the OpenGL technology and using the GPU, thereby improving the rendering speed, saving the consumption of system resources, ensuring the fluency of the system, providing a good fluency experience for users, and being suitable for low-performance terminals, and being able to obtain more diverse and cool dynamic happy-box effects, greatly meeting the personalized needs of users for font effects, and also being able to install font files through the font installation interface of the computer device, further improving the user experience.

In any of the above technical solutions, preferably, the text character pattern information includes any one or combination of the following: a whole-word base map, a component base map, and an outline base map; the template information includes any one or combination of the following: text dynamic typesetting information, text dynamic stretching and rotation information, text dynamic color information, pendant dynamic attribute information and text overall dynamic mask information; a character string consists of at least one character, and the character includes any one or combination of the following: Chinese character, Arabic character and English character.

In this technical solution, the text character pattern information consists of a single whole-word base map or a combination of the whole-word base map and one or more component base maps and the outline base map; the template information includes, but is not limited to, one or more of the following information: text dynamic typesetting information, text dynamic stretching and rotation information, text dynamic color information, pendant dynamic attribute information and text overall dynamic mask information; the character string can be any one or a combination of Chinese character, Arabic character and English character. Through the font rendering method of the present disclosure, the character pattern typesetting mode breaks the traditional text typesetting mode, and supports the mixed arrangement of text size, which fully expresses the semantic priority; supports customized text position, which enhances text visual impact; supports the customization of the any text color and special effects, which highlights the focus of the language; has a sense of design, which is more suitable for scene matching and picture-text combining and highlights the text artistic conception.

In any of the above technical solutions, preferably, the font file includes a font file of standard black-and-white words in a TrueType format and any one or combination of the following: a template attribute table, a character pattern typesetting information table, a character pattern rendering information table, a rendering information metadata table, a picture animation information table, a shader attribute table, a picture table and a shader source code table.

In this technical solution, the font file includes not only the font file of the standard black-and-white words in a TrueType format, but also one or combination of the following: the template attribute table, the character pattern typesetting information table, the character pattern rendering information table, the rendering information metadata table, the picture animation information table, the shader attribute table, the picture table and the shader source code table, thus being able to ensure the diversity, personalization and coolness of fonts and improve the user's experience of personalized texts and emotions.

The present disclosure also provides a font rendering apparatus, including: a memory for storing a computer program; a processor for executing a computer program to: receive a character string that needs to be rendered and read a font file; parse the font file to obtain text character pattern information and template information corresponding to the character string; generate an animation unit according to the text character pattern information and the template information; render the animation unit.

According to the font rendering apparatus of the present disclosure, a character string that needs to be rendered is received, for example, a character string input by a user is received from a client; a font file such as a dynamic happy-box TrueTypeFont (TTF) font library file is read; the font file is parsed to obtain text character pattern information and template information corresponding to the character string, and the text character pattern information and the template information are combined to generate an animation unit, where the frequency of the animation can be a fixed frame interval or an irregular frame interval, and then the animation unit is rendered; and after the rendering, it is outputted for performing effects presentation. Through the font rendering apparatus of the present disclosure, corresponding template effects can be customized according to different font effects and different rows and columns, and mixed arrangement of text size, customized text position, customized text color and special effects are supported, which are more suitable for scene matching and picture-text combining, thereby fully expressing semantic priority, enhancing text visual impact, highlighting the focus of the language and the text artistic conception, and presenting personalized effects of any different styles immediately according to user input, thus greatly meeting the personalized requirements of users during information interaction.

In the above technical solution, preferably, the processor is further configured to execute a computer program to: before the step of generating the animation unit according to the text character pattern information and the template information, perform interpolation operation on each motion attribute in the text character pattern information and/or the template information; the interpolation operation includes any one or combination of the following: a scaling, a rotation, a displacement, a color, a transparency, a stroke, a shadow and a luminescence.

In this technical solution, before the step of performing data combination between the text character pattern information and the template information, the interpolation operation is performed on each motion attribute in the text character pattern information and/or template information, so that the motion effect of fonts can be smoother and smoother, and the transformation between character pattern and templates can be realized, such as the scaling, the rotation, the displacement, the color, the transparency, the stroke, the shadow, the luminescence, etc., thereby ensuring the diversification, personalization and coolness of fonts and enhancing the visual effect.

In any of the above technical solutions, preferably, the processor is specifically configured to execute the computer program to: perform frame layer rendering of each frame data of the animation unit by GPU, and perform color filling; where the frame layer rendering includes background effect drawing, single word image effect drawing, whole image effect drawing, font effect drawing and foreground effect drawing; a way of the color filling includes any one or combination of the following: a gradient, a texture, a pure color and an animation.

In this technical solution, the present disclosure renders the animation unit based on the Open Graphics Library (OpenGL) technology and using the Graphics Processing Unit (GPU). OpenGL is a hardware-independent software interface, which can be transplanted between various platforms. Therefore, no matter for system-level access or application-level access, both of them can be well compatible. Specifically, the animation unit is sent to GPU in the data format of each frame for performing frame layer rendering and the color filling is performed simultaneously. After the rendering is completed, frame layer data is extracted from GPU, frame bitmap data is formed in memory, and the frame bitmap data is output to external application for performing effect presentation. The frame layer rendering process includes background effect drawing, single word image effect drawing, whole image effect drawing, font effect drawing and foreground effect drawing; the way of the color filling includes, but is not limited to, any one or combination of the gradient, the texture and the pure color. The present disclosure performs font rendering and animation rendering based on the OpenGL technology and using the GPU, thereby improving the rendering speed, saving the consumption of system resources, ensuring the fluency of the system, providing a good fluency experience for users, and being suitable for low-performance terminals, and being able to obtain more diverse and cool dynamic happy-box effects, greatly meeting the personalized needs of users for font effects, and also being able to install font files through the font installation interface of the computer device, further improving the user experience.

In any of the above technical solutions, preferably, the text character pattern information includes any one or combination of the following: a whole-word base map, a component base map, and an outline base map; the template information includes any one or combination of the following: text dynamic typesetting information, text dynamic stretching and rotation information, text dynamic color information, pendant dynamic attribute information and text overall dynamic mask information; a character string consists of at least one character, and the character includes any one or combination of the following: Chinese character, Arabic character and English character.

In this technical solution, the text character pattern information consists of a single whole-word base map or a combination of the whole-word base map and one or more component base maps and the outline base map; the template information includes, but is not limited to, one or more of the following information: text dynamic typesetting information, text dynamic stretching and rotation information, text dynamic color information, pendant dynamic attribute information and text overall dynamic mask information; the character string can be any one or combination of Chinese character, Arabic character and English character. Through the font rendering method of the present disclosure, the character pattern typesetting mode breaks the traditional text typesetting mode, and supports the mixed arrangement of text size, which fully expresses the semantic priority; supports customized text position, which enhances text visual impact; supports the customization of the any text color and special effects, which highlights the focus of the language; has a sense of design, which is more suitable for scene matching and picture-text combining and highlights the text artistic conception.

In any of the above technical solutions, preferably, the font file includes a font file of standard black-and-white words in a TrueType format and any one or combination of the following: a template attribute table, a character pattern typesetting information table, a character pattern rendering information table, a rendering information metadata table, a picture animation information table, a shader attribute table, a picture table and a shader source code table.

In this technical solution, the font file includes not only the font file of the standard black-and-white words in a TrueType format, but also one or combination of the following: the template attribute table, the character pattern typesetting information table, the character pattern rendering information table, the rendering information metadata table, the picture animation information table, the shader attribute table, the picture table and the shader source code table, thus being able to ensure the diversity, personalization and coolness of fonts and improve the user's experience of personalized texts and emotions.

In any of the above technical solutions, preferably, upon receiving a command for copying the rendered font effect, the rendered font effect is restored to the character string and the pasting is performed.

In this technical solution, the user can copy the font effect that has been presented, and restore it to the previously input text after copying, and then edit it again or paste it into a notebook, etc., for further performing the text processing as required.

The present disclosure also provides a computer-readable storage medium, including: the font rendering apparatus according to any one of the above technical solutions.

The computer-readable storage medium according to the present disclosure includes the font rendering apparatus according to any one of the above technical solutions, so it has all the beneficial effects of the font rendering apparatus, and will not be repeated herein.

Additional aspects and advantages of the present disclosure will become apparent in the following description part, or may be learned through practice of the present disclosure.

BRIEF DESCRIPTION OF THE DRAWINGS

The above and/or additional aspects and advantages of the present disclosure will become apparent and easily understood from the description of embodiments taken in conjunction with the following drawings, in which.

DETAILED DESCRIPTION OF THE EMBODIMENTS

In order to better understand the above objects, features and advantages of the present disclosure, the present disclosure will be further described in detail with reference to the drawings and specific embodiments. It should be noted that the embodiments of the present application and the features in the embodiments can be combined with each other without conflict.

Many specific details are set forth in the following description in order to fully understand the present disclosure. However, the present disclosure can also be implemented in other ways different from those described herein. Therefore, the scope of protection of the present disclosure is not limited by the specific embodiments disclosed below.

Figure 1:
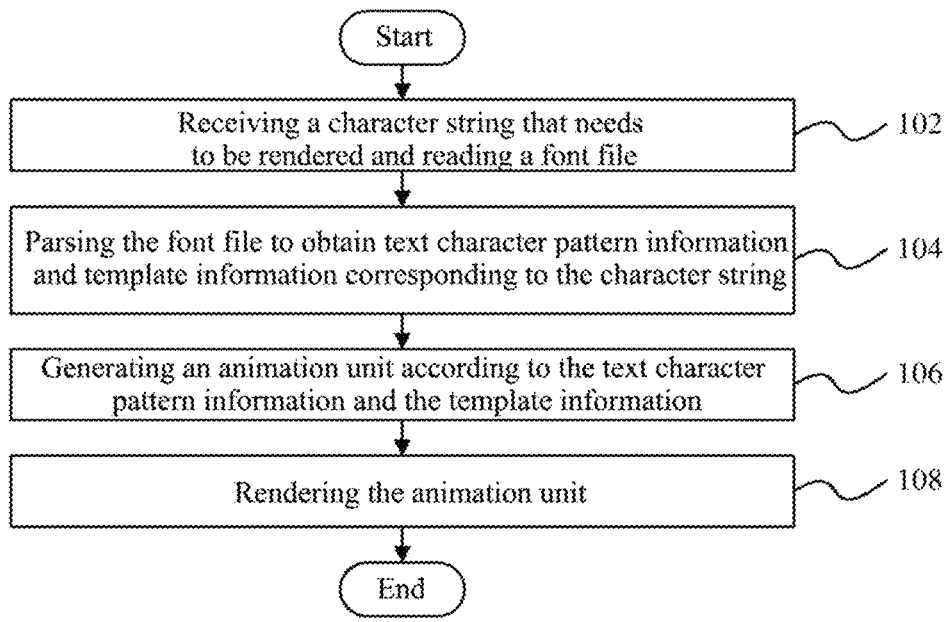
FIG. 1 shows a schematic flowchart of a font rendering method according to an embodiment of the present disclosure.

As shown in FIG. 1, a schematic flowchart of a font rendering method according to an embodiment of the present disclosure, where the font rendering method includes:

Step 102, receiving a character string that needs to be rendered and reading a font file;

Step 104, parsing the font file to obtain text character pattern information and template information corresponding to the character string;

Step 106, generating an animation unit according to the text character pattern information and the template information;

Step 108, rendering the animation unit.

For the font rendering method provided by the embodiments of the present disclosure, a character string that needs to be rendered is received, for example, a character string input by a user is received from a client; a font file such as a dynamic happy-box TrueTypeFont (TTF) font library file is read; the font file is parsed to obtain text character pattern information and template information corresponding to the character string; and the text character pattern information and the template information are combined to generate an animation unit, where the frequency of the animation can be a fixed frame interval or an irregular frame interval; and then the animation unit is rendered; and after the rendering, it is outputted for performing effects presentation. Through the font rendering method of the present disclosure, corresponding template effects can be customized according to different font effects and different rows and columns, and mixed arrangement of text size, customized text position, customized text color and special effects are supported, which are more suitable for scene matching and picture-text combining, thereby fully expressing semantic priority, enhancing text visual impact, highlighting the focus of the language and the text artistic conception, and presenting personalized effects of any different styles immediately according to user input, thus greatly meeting the personalized requirements of users during information interaction.

Figure 2:
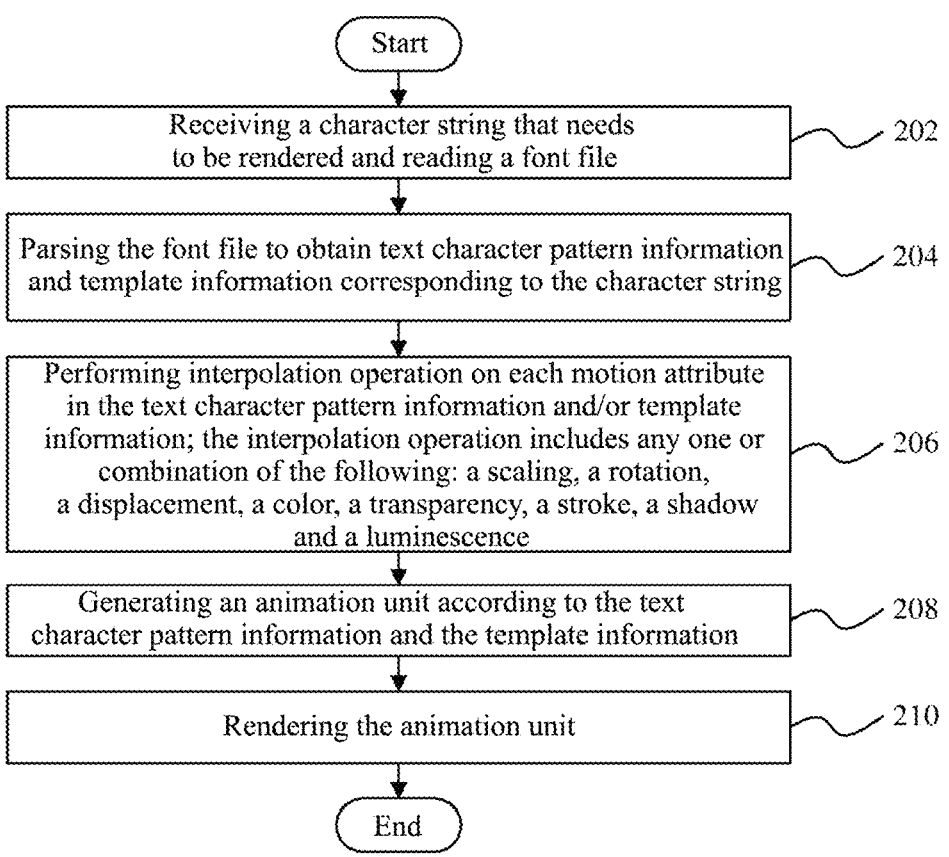
FIG. 2 shows a schematic flowchart of a font rendering method according to another embodiment of the present disclosure.

As shown in FIG. 2, a schematic flowchart of a font rendering method according to another embodiment of the present disclosure, where the font rendering method includes:

Step 202, receiving a character string that needs to be rendered and reading a font file;

Step 204, parsing the font file to obtain text character pattern information and template information corresponding to the character string;

Step 206, performing interpolation operation on each motion attribute in the text character pattern information and/or template information; where the interpolation operation includes any one or combination of the following: a scaling, a rotation, a displacement, a color, a transparency, a stroke, a shadow and a luminescence;

Step 208, generating an animation unit according to the text character pattern information and the template information;

Step 210, rendering the animation unit.

In this embodiment, before the step of performing data combination between the text character pattern information and the template information, the interpolation operation is performed on each motion attribute in the text character pattern information and/or template information, so that the motion effect of fonts can be smoother and smoother, and the transformation between character pattern and templates can be realized, such as the scaling, the rotation, the displacement, the color, the transparency, the stroke, the shadow, the luminescence, etc., thereby ensuring the diversification, personalization and coolness of fonts and enhancing the visual effect.

Figure 3:
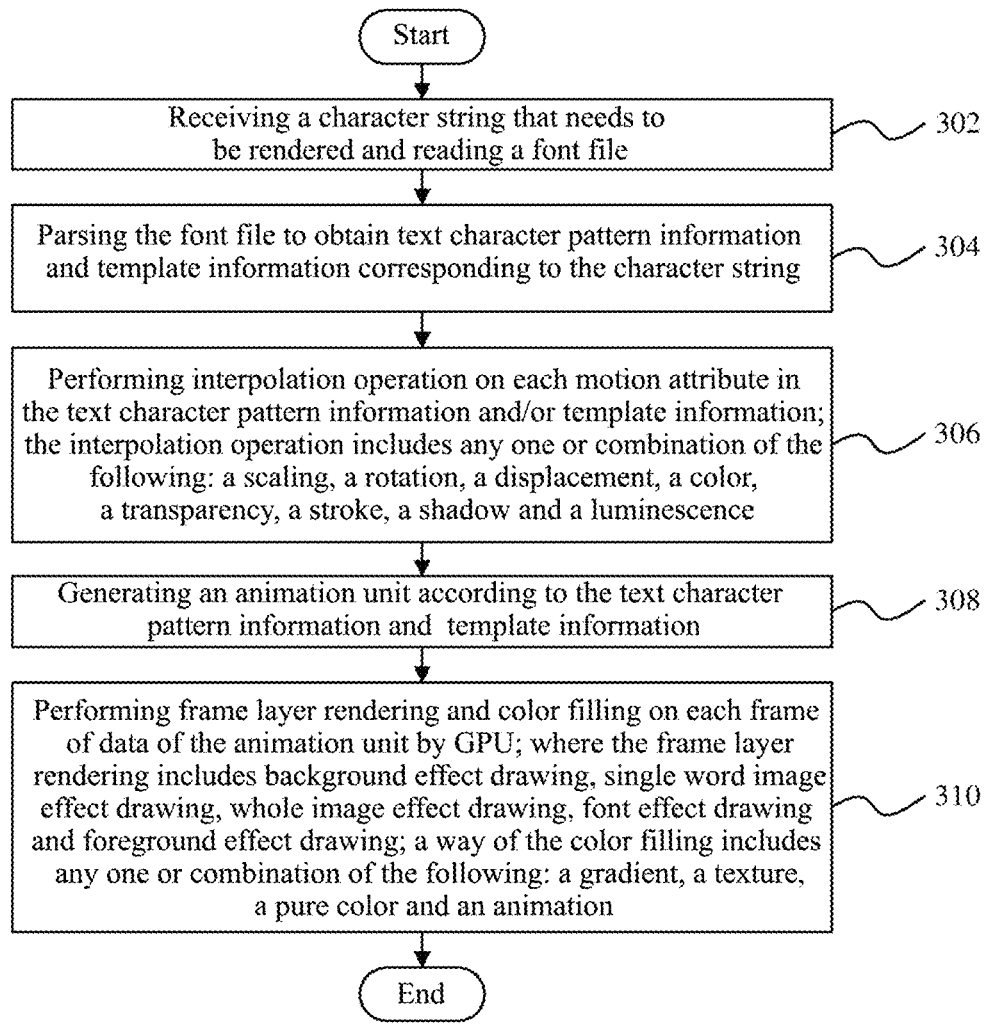
FIG. 3 shows a schematic flowchart of a font rendering method according to yet another embodiment of the present disclosure.

As shown in FIG. 3, a schematic flowchart of a font rendering method according to yet another embodiment of the present disclosure, where the font rendering method includes:

Step 302, receiving a character string that needs to be rendered and reading a font file;

Step 304, parsing the font file to obtain text character pattern information and template information corresponding to the character string;

Step 306, performing interpolation operation on each motion attribute in the text character pattern information and/or template information; where the interpolation operation includes any one or combination of the following: a scaling, a rotation, a displacement, a color, a transparency, a stroke, a shadow and a luminescence;

Step 308, generating an animation unit according to the text character pattern information and the template information;

Step 310, performing frame layer rendering and color filling on each frame of data of the animation unit by GPU; where the frame layer rendering includes background effect drawing, single word image effect drawing, whole image effect drawing, font effect drawing and foreground effect drawing; a way of the color filling includes any one or combination of the following: a gradient, a texture, a pure color and an animation.

In this embodiment, the present disclosure renders the animation unit based on the Open Graphics Library (OpenGL) technology and using the Graphics Processing Unit (GPU). OpenGL is a hardware-independent software interface, which can be transplanted between various platforms. Therefore, no matter for system-level access or application-level access, both of them can be well compatible. Specifically, the animation unit is sent to GPU in the data format of each frame for performing frame layer rendering and the color filling is performed simultaneously. After the rendering is completed, frame layer data is extracted from GPU, frame bitmap data is formed in memory, and the frame bitmap data is output to external application for performing effect presentation. The frame layer rendering process includes background effect drawing, single word image effect drawing, whole image effect drawing, font effect drawing and foreground effect drawing; the way of the color filling includes, but is not limited to, any one or combination of a gradient, a texture and a pure color. The present disclosure performs font rendering and animation rendering based on the OpenGL technology and using the GPU, thereby improving the rendering speed, saving the consumption of system resources, ensuring the fluency of the system, providing a good fluency experience for users, and being suitable for low-performance terminals, and being able to obtain more diverse and cool dynamic happy-box effects, greatly meeting the personalized needs of users for font effects, and also being able to install font files through the font installation interface of the computer device, further improving the user experience.

In any of the above embodiments, preferably, the text character pattern information includes any one or combination of the following: a whole-word base map, a component base map, and an outline base map; the template information includes any one or combination of the following: text dynamic typesetting information, text dynamic stretching and rotation information, text dynamic color information, pendant dynamic attribute information and text overall dynamic mask information; a character string consists of at least one character, and the character includes any one or combination of the following: Chinese character, Arabic character and English character.

In this embodiment, the text character pattern information consists of a single whole-word base map or a combination of the whole-word base map and one or more component base maps and the outline base map; the template information includes, but is not limited to, one or more of the following information: text dynamic typesetting information, text dynamic stretching and rotation information, text dynamic color information, pendant dynamic attribute information and text overall dynamic mask information; the character string can be any one or combination of Chinese character, Arabic character and English character. Through the font rendering method of the present disclosure, the character pattern typesetting mode breaks the traditional text typesetting mode, and supports the mixed arrangement of text size, which fully expresses the semantic priority; supports customized text position, which enhances text visual impact; supports the customization of the any text color and special effects, which highlights the focus of the language; has a sense of design, which is more suitable for scene matching and picture-text combining and highlights the text artistic conception.

In any of the above embodiments, preferably, the font file includes a font file of standard black-and-white words in a TrueType format and any one or combination of the following: a template attribute table, a character pattern typesetting information table, a character pattern rendering information table, a rendering information metadata table, a picture animation information table, a shader attribute table, a picture table and a shader source code table.

In this embodiment, the font file includes not only the font file of the standard black-and-white words in a TrueType format, but also one or combination of the following: the template attribute table, the character pattern typesetting information table, the character pattern rendering information table, the rendering information metadata table, the picture animation information table, the shader attribute table, the picture table and the shader source code table, thus being able to ensure the diversity, personalization and coolness of fonts and improve the user's experience of personalized texts and emotions.

In any of the above embodiments, preferably, upon receiving a command for copying the rendered font effect, the rendered font effect is restored to the character string and the pasting is performed.

In this embodiment, the user can copy the font effect that has been presented, and restore it to the previously input text after copying, and then edit it again or paste it into a notebook, etc., for further performing the text processing as required.

Figure 4:
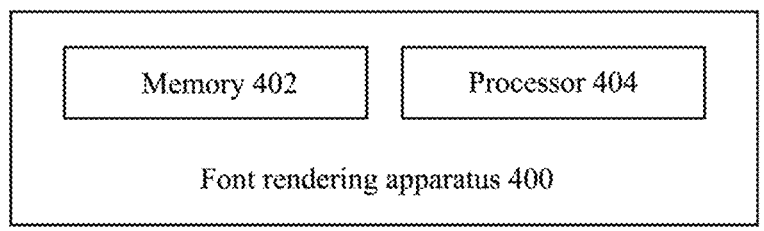
FIG. 4 shows a schematic block diagram of a font rendering apparatus according to an embodiment of the present disclosure.

As shown in FIG. 4, a schematic block diagram of a font rendering apparatus according to an embodiment of the present disclosure, where the font rendering apparatus 400 includes:

a memory 402, configured to store a computer program;

a processor 404, configured to execute a computer program to: receive a character string that needs to be rendered and read a font file; parse the font file to obtain text character pattern information and template information corresponding to the character string; generate an animation unit according to the text character pattern information and the template information; render the animation unit.

For the font rendering apparatus 400 of the embodiments of the present disclosure, a character string that needs to be rendered is received, for example, a character string input by a user is received from a client; a font file such as a dynamic happy-box TrueTypeFont (TTF) font library file is read; the font file is parsed to obtain text character pattern information and template information corresponding to the character string; and the text character pattern information and the template information are combined to generate an animation unit, where the frequency of the animation can be a fixed frame interval or an irregular frame interval; and then the animation unit is rendered; and after the rendering, it is outputted for performing effects presentation. Through the font rendering apparatus 400 of the present disclosure, corresponding template effects can be customized according to different font effects and different rows and columns, and mixed arrangement of text size, customized text position, customized text color and special effects are supported, which are more suitable for scene matching and picture-text combining, thereby fully expressing semantic priority, enhancing text visual impact, highlighting the focus of the language and the text artistic conception, and presenting personalized effects of any different styles immediately according to user input, thus greatly meeting the personalized requirements of users during information interaction.

In the above embodiment, preferably, the processor 404 is further configured to execute the computer program to: before the step of generating the animation unit according to the text character pattern information and the template information, perform interpolation operation on each motion attribute in the text character pattern information and/or the template information; the interpolation operation includes any one or combination of the following: a scaling, a rotation, a displacement, a color, a transparency, a stroke, a shadow and a luminescence.

In this embodiment, before the step of performing data combination between the text character pattern information and the template information, the interpolation operation is performed on each motion attribute in the text character pattern information and/or template information, so that the motion effect of fonts can be smoother and smoother, and the transformation between character pattern and templates can be realized, such as the scaling, the rotation, the displacement, the color, the transparency, the stroke, the shadow, the luminescence, etc., thereby ensuring the diversification, personalization and coolness of fonts and enhancing the visual effect.

In any of the above embodiments, preferably, the processor 404 is specifically configured to execute the computer program to: perform frame layer rendering and color filling on each frame of data of the animation unit by GPU; where the frame layer rendering includes background effect drawing, single word image effect drawing, whole image effect drawing, font effect drawing and foreground effect drawing; a way of the color filling includes any one or combination of the following: a gradient, a texture, a pure color and an animation.

In this embodiment, the present disclosure renders the animation unit based on the Open Graphics Library (OpenGL) technology and using the Graphics Processing Unit (GPU). OpenGL is a hardware-independent software interface, which can be transplanted between various platforms. Therefore, no matter for system-level access or application-level access, both of them can be well compatible. Specifically, the animation unit is sent to GPU in the data format of each frame for performing frame layer rendering and the color filling is performed simultaneously. After the rendering is completed, frame layer data is extracted from GPU, frame bitmap data is formed in memory, and the frame bitmap data is output to external application for performing effect presentation. The frame layer rendering process includes background effect drawing, single word image effect drawing, whole image effect drawing, font effect drawing and foreground effect drawing; the way of the color filling includes, but is not limited to, any one or combination of the gradient, the texture, the pure color. The present disclosure performs font rendering and animation rendering based on the OpenGL technology and using the GPU, thereby improving the rendering speed, saving the consumption of system resources, ensuring the fluency of the system, providing a good fluency experience for users, and being suitable for low-performance terminals, and being able to obtain more diverse and cool dynamic happy-box effects, greatly meeting the personalized needs of users for font effects, and also being able to install font files through the font installation interface of the computer device, further improving the user experience.

In an embodiment of the present disclosure, preferably, the text character pattern information includes any one or combination of the following: a whole-word base map, a component base map, and an outline base map; the template information includes any one or combination of the following: text dynamic typesetting information, text dynamic stretching and rotation information, text dynamic color information, pendant dynamic attribute information and text overall dynamic mask information; a character string consists of at least one character, and the character includes any one or combination of the following: Chinese character, Arabic character and English character.

In this embodiment, the text character pattern information consists of a single whole-word base map or a combination of the whole-word base map and one or more component base maps and the outline base map; the template information includes, but is not limited to, one or more of the following information: text dynamic typesetting information, text dynamic stretching and rotation information, text dynamic color information, pendant dynamic attribute information and text overall dynamic mask information; the character string can be any one or combination of Chinese character, Arabic character and English character. Through the font rendering method of the present disclosure, the character pattern typesetting mode breaks the traditional text typesetting mode, and supports the mixed arrangement of text size, which fully expresses the semantic priority; supports customized text position, which enhances text visual impact; supports the customization of the any text color and special effects, which highlights the focus of the language; has a sense of design, which is more suitable for scene matching and picture-text combining and highlights the text artistic conception.

In an embodiment of the present disclosure, the font file includes a font file of standard black-and-white words in a TrueType format and any one or combination of the following: a template attribute table, a character pattern typesetting information table, a character pattern rendering information table, a rendering information metadata table, a picture animation information table, a shader attribute table, a picture table and a shader source code table.

In this embodiment, the font file includes not only the font file of the standard black-and-white words in a TrueType format, but also one or combination of the following: the template attribute table, the character pattern typesetting information table, the character pattern rendering information table, the rendering information metadata table, the picture animation information table, the shader attribute table, the picture table and the shader source code table, thus being able to ensure the diversity, personalization and coolness of fonts and improve the user's experience of personalized texts and emotions.

In an embodiment of the present disclosure, upon receiving a command for copying the rendered font effect, the rendered font effect is restored to the character string and the pasting is performed.

In this embodiment, the user can copy the font effect that has been presented, and restore it to the previously input text after copying, and then edit it again or paste it into a notebook, etc., for further performing the text processing as required.

Figure 5:
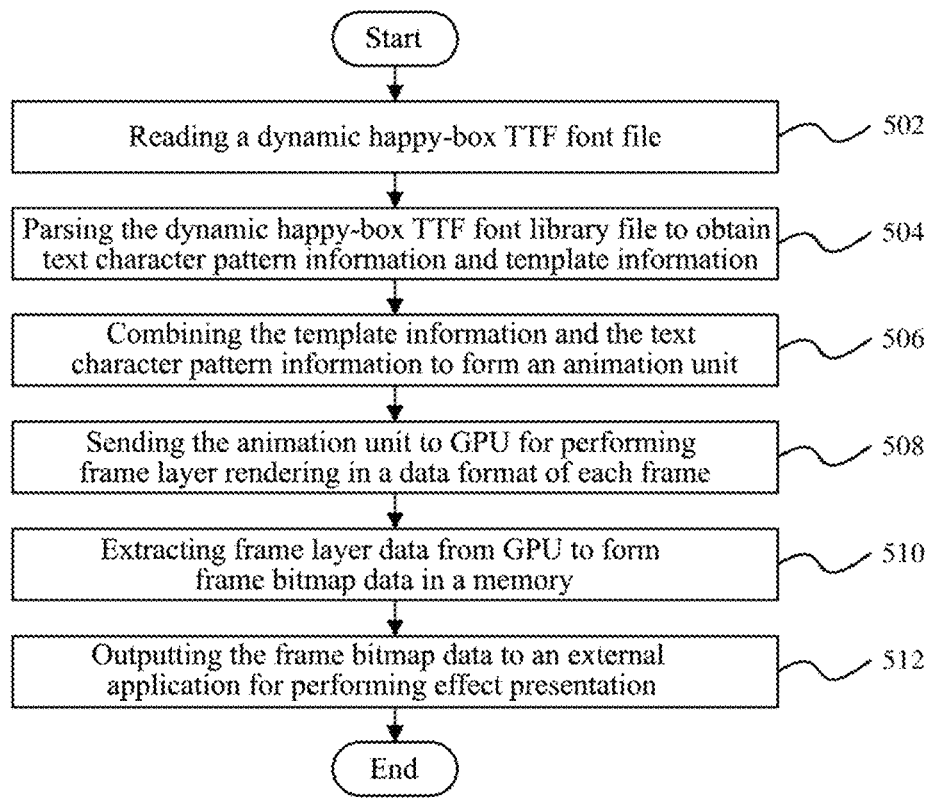
FIG. 5 shows a schematic flowchart of a font rendering method according to a specific embodiment of the present disclosure.

As shown in FIG. 5, a schematic flowchart of a font rendering method according to a specific embodiment of the present disclosure, where the font rendering method includes:

Step 502, reading a dynamic happy-box TTF font library file;

Step 504, parsing the dynamic happy-box TTF font library file to obtain text character pattern information and template information;

Step 506, combining the template information and the text character pattern information to form an animation unit.

Step 508, sending the animation unit to GPU for performing frame layer rendering in a data format of each frame.

Step 510, extracting frame layer data from GPU to form frame bitmap data in a memory.

Step 512, outputting the frame bitmap data to an external application for performing dynamic happy-box effect presentation.

Figure 6:
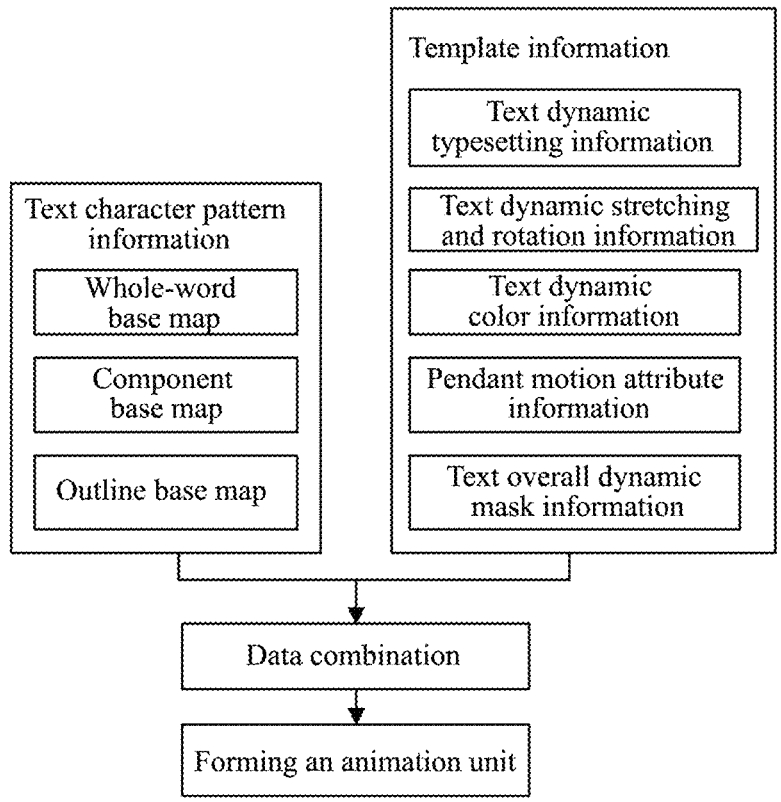
FIG. 6 shows a schematic diagram of data combination according to a specific embodiment of the present disclosure.

In this embodiment, the animation unit is formed by performing data combination of the text character pattern information and the template information. The schematic diagram of data combination is shown in FIG. 6, where the frequency of the animation can be a fixed frame interval or an irregular frame interval.

Dynamic happy-box TTF font library file includes a font file of standard black-and-white words in a TrueType format and any one or combination of the following: a template attribute table, a character pattern typesetting information table, a character pattern rendering information table, a rendering information metadata table, a picture animation information table, a shader attribute table, a picture table and a shader source code table, etc.

The text character pattern information is a single whole-word base map or a combination of the whole-word base map and one or more component base maps and outline base maps; the template information includes any one or combination of the following: text dynamic typesetting information, text dynamic stretching and rotation information, text dynamic color information, pendant dynamic attribute information and text overall dynamic mask information.

In a specific embodiment of the present disclosure, before data combination is performed, an interpolation operation is performed on each motion attribute, including but not limited to, a scaling, a rotation, a displacement, a color, a transparency, a stroke, a shadow, a luminescence, etc.

In a specific embodiment of the present disclosure, upon receiving a command for copying the dynamic happy-box effect, the dynamic happy-box effect is restored to the previously inputted text.

Figure 7:
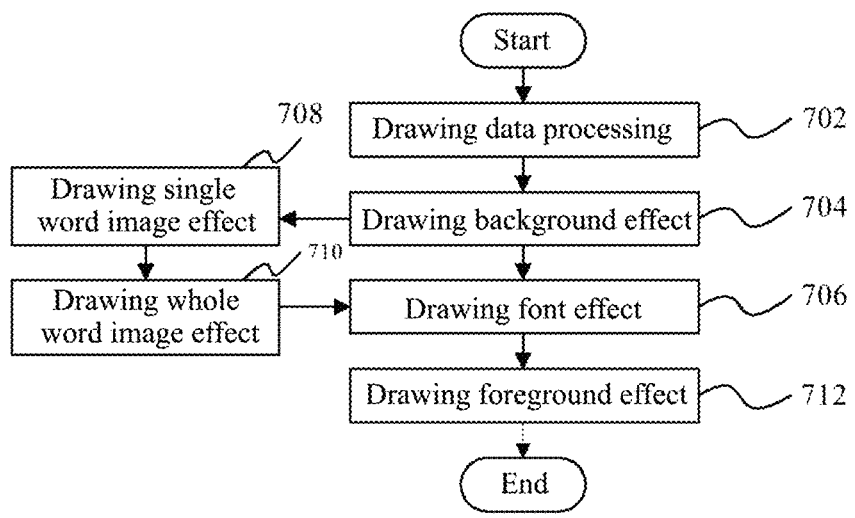
FIG. 7 shows a schematic flowchart of GPU rendering according to a specific embodiment of the present disclosure.

FIG. 7 shows a process of GPU rendering frame layer for each frame data of an animation unit, which specifically includes following steps:

Step 702, drawing data processing;
Step 704, drawing background effect;
Step 706, drawing font effect;
Step 708, drawing single word image;
Step 710, drawing whole word image;
Step 712, drawing foreground effect.

The font rendering method provided by the embodiments of the present disclosure breaks the traditional typesetting way that is from left to right, from top to bottom, with fixed row spacing and column spacing, and supports mixed arrangement of text size, which fully expresses semantic priority; supports customized text position, which enhances text visual impact; supports the customization of the any text color and special effects, which highlights the focus of the language; has a sense of design, and is more suitable for scene matching and picture-text combining, which highlights the text artistic conception; at the same time, the user inputs presents effect immediately, and the user can input any text according to the content he wants to express, and then he can obtain a dynamic happy-box effect generated according to the template corresponding to the number of text; the user can copy the dynamic happy-box effect that has been presented, and restore it to the previously inputted text after pasting, and then edit it again or paste it into a notebook, etc., for further performing text processing as required. In addition, the GPU rendering based on the OpenGL technology improves the rendering speed, saves the consumption of system resources, ensures the fluency of the system, provides a good fluency experience for users, is suitable for low-performance terminals, and further improves the user experience.

The embodiments of the present disclosure also provide a computer-readable storage medium, including: the font rendering apparatus according to any one of the above embodiments.

The computer-readable storage medium of the embodiments of the present disclosure includes the font rendering apparatus according to any one of the above embodiments, so it has all the beneficial effects of the font rendering apparatus, and will not be described again.

The above are only preferred embodiments of the present disclosure, and are not intended to limit the present disclosure. For those skilled in the art, various modifications and changes of the present disclosure are possible. Any modification, equivalent substitution, improvement, etc. made within the spirit and principle of the present disclosure shall be included in the scope of protection of the present disclosure.

What is claimed is:

1. A font rendering method, comprising:
receiving a character string that needs to be rendered;
reading a font file;
parsing the font file to obtain text character pattern information and template information corresponding to the character string;
generating an animation unit according to the text character pattern information and the template information; and
rendering the animation unit, wherein, before generating the animation unit according to the text character pattern information and the template information, the method further comprises;
performing an interpolation operation on each motion attribute in the text character pattern information and/or the template information; and the interpolation operation comprises a displacement, a shadow, and a luminescence, wherein a frequency of the animation unit is an irregular frame interval, and the method further comprises:
restoring a rendered font effect to the character string; and
pasting the character string upon receiving a command for copying the rendered font effect.

2. The font rendering method according to claim 1, wherein rendering the animation unit comprises:
performing frame layer rendering and color filling on each frame of data of the animation unit by graphics processing unit (GPU); wherein the frame layer rendering comprises: background effect drawing, single word image effect drawing, whole image effect drawing, font effect drawing, and foreground effect drawing; and a way of the color filling comprises one or more of:
a gradient, a texture, a pure color, and an animation.

3. The font rendering method according to claim 1, wherein, the text character pattern information comprises one or more of: a whole-word base map, a component base map, and an outline base map; the template information comprises one or more of: text dynamic typesetting information, text dynamic stretching and rotation information, text dynamic color information, pendant dynamic attribute information, and text overall dynamic mask information; and the character string comprises at least one character, and the character comprises any one or combination of the following: a Chinese character, an Arabic character, and an English character.

4. The font rendering method according to claim 1, wherein, the font file comprises a font file of standard black-and-white words in a TrueType format and one or more of: a template attribute table, a character pattern typesetting information table, a character pattern rendering information table, a rendering information metadata table, a picture animation information table, a shader attribute table, a picture table, and a shader source code table.

5. A font rendering apparatus, comprising:
a memory configured to store a computer program;
a processor configured to execute the computer program to:
receive a character string that needs to be rendered and read a font file;
parse the font file to obtain text character pattern information and template information corresponding to the character string;
generate an animation unit according to the text character pattern information and the template information; and
render the animation unit; wherein the processor is further configured to execute the computer program to: before generating the animation unit according to the text character pattern information and the template information,
perform interpolation operation on each motion attribute in the text character pattern information and/or the template information, wherein the interpolation operation comprises a displacement, a shadow, and a luminescence, wherein a frequency of the animation unit is an irregular frame interval, and the processor is further configured to execute the computer program to:
restore a rendered font effect to the character string; and
paste the character string upon receiving a command for copying the rendered font effect.

6. The font rendering apparatus according to claim 5, wherein the processor is configured to execute the computer program to:
perform frame layer rendering and color filling on each frame of data of the animation unit by graphics processing unit (GPU); wherein the frame layer rendering comprises background effect drawing, single word image effect drawing, whole image effect drawing, font effect drawing, and foreground effect drawing; and a way of the color filling comprises any one or combination of the following: a gradient, a texture, a pure color and an animation.

7. The font rendering apparatus according to claim 5, wherein, the text character pattern information comprises one or more of: a whole-word base map, a component base map, and an outline base map; the template information comprises one or more of: text dynamic typesetting information, text dynamic stretching and rotation information, text dynamic color information, text size information, pendant dynamic attribute information, and text overall dynamic mask information; and the character string comprises at least one character, and the character comprises one or more of: a Chinese character, an Arabic character, and an English character.

8. The font rendering apparatus according to claim 5, wherein, the font file comprises a font file of standard black-and-white words in a TrueType format and one or more of: a template attribute table, a character pattern typesetting information table, a character pattern rendering information table, a rendering information metadata table, a picture animation information table, a shader attribute table, a picture table, and a shader source code table.

9. A computer-readable storage medium, comprising: the font rendering apparatus according to claim 5.

10. The font rendering method according to claim 1, wherein the method further comprises
customizing template effects according to different font effects and different rows and columns.

11. The font rendering method according to claim 1, wherein the method further comprises
arranging text size in the animation unit in a mixed manner,
customizing text position in the animation unit, and
customizing text color and special effects in the animation unit.

12. The font rendering method according to claim 2, wherein the animation unit is rendered based on Open Graphics Library (OpenGL) technology and using the GPU, wherein the OpenGL is a hardware-independent software interface and transplanted between various platforms.

13. The font rendering apparatus according to claim 5, wherein the processor is further configured to execute the computer program to customize template effects according to different font effects and different rows and columns.

14. The font rendering apparatus according to claim 5, wherein the processor is further configured to execute the computer program to
arrange text size in the animation unit in a mixed manner,
customize text position in the animation unit, and
customize text color and special effects in the animation unit.

15. The font rendering apparatus according to claim 6, wherein the animation unit is rendered based on Open Graphics Library (OpenGL) technology and using the GPU, wherein the OpenGL is a hardware-independent software interface and transplanted between various platforms.

* * * * *